3,398,098
PREPARATION OF PURE DENSE HYPOSTOICHI-
OMETRIC URANIUM CARBIDE
Lloyd A. Hanson, Canoga Park, Calif., assignor, by mesne
assignments, to the United States of America as represented by the United States Atomic Energy Commission
No Drawing. Filed June 9, 1967, Ser. No. 645,579
1 Claim. (Cl. 252—301.1)

ABSTRACT OF THE DISCLOSURE

A method is disclosed for preparing hypostoichiometric uranium carbide which includes blending suitable mixture of $UO_2$, $U_3O_8$ or $UO_3$ and carbon powder in an amount sufficient for normally producing hyperstoichiometric or stoichiometric uranium carbide and adding to the blend small amounts of uranium alloys of the order of 1–5% by weight. The carbothermic reduction process is used for heating the mixture to a temperature of the order of 1700–1750° C. so that the alloy decomposes, the foreign metal is removed as a vapor and the free uranium combines to produce hypostoichiometric UC.

Background of the invention

This invention relates to a method of preparing hypostoichiometric uranium carbide by the addition of uranium alloys during the carbothermic reduction process. This invention arose in the course of or under Contract AT(11–1)–GEN–8 with the United States Atomic Energy Commission.

Uranium carbide as a fuel for nuclear reactors is well known. However, it is known that harmful carburization of the steel cladding may result where the carbon content of the fuel is of certain values.

The stoichiometric value of carbon content is approximately 4.80 percent by weight. In order to decrease such carburization, hypostoichiometric UC is preferred and has a carbon content of 4.65± .15 percent by weight.

However, the stoichiometry or the amount of carbon in a finished product is influenced by a number of factors besides the initial ingredients; for example, the temperature, the amount of uranium vaporization and reducing agent used may affect the carbon content of the finished product.

In addition, where a method is devised for controlling the stoichiometry of the fuel, that process may involve materials having contaminants or otherwise produce a fuel which is unacceptable for nuclear reactor use, especially where $UO_2$ is a starting material.

Accordingly, it is an object of this invention to produce hypostoichiometric uranium carbide from $UO_2$ which is dense enough for vibratory compaction, has a low oxygen content, low uranium vaporization and low contamination by foreign products.

Summary of invention

The invention provides an improved method using the carbothermic process in which $UO_2$, $U_3O_8$ or $UO_3$ and carbon are blended in amounts to normally produce hyperstoichiometric UC. Uranium alloys are ground and added to the blend so that when the temperature is raised, the alloy decomposes with the result that free uranium increases the uranium content of the system while the foreign metal vaporizes to thereby remove oxygen and itself.

Description of the invention

Uranium carbide as a reactor fuel is preferred in the enriched state. One source of starting materials is uranium oxide or carbide from spent fuel rods. This uranium oxide may be recovered from such rods by several known methods. One of the preferred steps or methods for such recovery includes a step of oxidation and/or reduction depending upon whether the starting material is an oxide or carbide. One known process for such oxidation and/or reduction is the carbothermic process in which the uranium oxide or uranium carbide is pulverized into a powder, blended with carbon into a uniform mixture and then heated in an induction heater to temperatures of 1300–1900° C. in a vacuum in one or more steps for several hours, essentially to reduce the oxide with the removal of CO and with the formation of UC. If UC is the starting material, it is converted to uranium oxide prior to the reduction step mentioned above.

Hypostoichiometric UC is preferred for reactors because of its low carburization effects. However, the stoichiometry of the fuel material is only one requirement in producing acceptable fuel since during any fuel-making process, uranium may be volatilized, oxygen may be present in the starting materials, and, of course, the density and grain size are important for its use as a reactor fuel, especially if compaction and sintering are to be used in making the finished fuel element.

This invention provides a satisfactory fuel element by adding uranium alloys to the blend of $UO_2$, $U_3O_8$ or $UO_3$ and carbon powders which are subjected to heating in the carbothermic process.

Uranium oxide and carbon powders are measured and blended as a first step in amounts to produce stoichiometric or slightly hyperstoichiometric UC when subjected to the carbothermic process. The amount of carbon is approximately 13.5% by weight of the uranium oxide. Uranium alloys in powder form in amounts of from 1 to 5% by weight are then added to the oxide and carbon blend, and the resulting blend is completely mixed. The blended material containing $UO_2$, carbon and uranium alloy is then inserted in a graphite vessel within a furnace which is subsequently evacuated to approximately $10^{-4}$ to $10^{-5}$ atmospheres. The furnace temperature is adjusted to 1700–1750° C. for several hours. CO gas is removed and the resulting UC is ready for compaction and sintering or melting and casting into fuel rods.

The uranium alloys may include USi, $UAl_2$, $UFe_2$, $UFe_{0.5}$, $UNi_2$ and $UNi_{0.5}$. Normally, such additions would be considered as contaminants. However, for the process described supra, there are numerous advantages and no contamination problem exists.

One advantage is that the finishing temperature for resulting fuel rods has been reduced to less than 1750° C. Thus there is a minimum of uranium vaporization and a minimum fluctuation in carbon content. This temperature, however, is sufficient for almost completely vaporizing the added foreign metal (nickel, aluminum, iron and silicon) to thus remove their presence as a contaminant while also reducing the oxygen content of the fuel. Another advantage of using the uranium alloys is that they are easily crushed into a fine powder and readily mixed to provide a uniform mixture of the oxides and carbon for the process described supra. All three powders have approximately the same grain size and have been passed through a 200 mesh sieve.

Other advantages of producing UC by this described method have been verified by experiment and testing. In one example where 5% $UNi_2$ by weight was mixed with $UO_2$ and carbon and heated to 1750° C., the resulting product was hypostoichiometric UC containing 4.70% by weight of carbon, 260 parts per million $O_2$ and a particle density of 13.2 grams/cc. corresponding to 96% of theoretical density. Other tests using $U_3O_8$ and $UNi_2$ produced practically the same results, except that $O_2$ was present as 360 p.p.m. Another example using $UO_2$ and 5% $UFe_2$ produced 600 p.p.m. $O_2$, and gave practically the same results except that $O_2$ was present as 600 p.p.m.

The method using UFe₂ alloy had the advantage of producing UC with very low iron, 20–30 p.p.m., in contrast with 200–300 p.p.m. of Ni residual remaining in the other experiments.

The additives involved in this invention have a volatilization temperature of 1200–1600° C., which is thus less than the finishing temperature of the fuel. Other examples of alloy additives are U—$C_r$, U—Mn and U—$C_o$. While the finishing temperature has been referred to as 1750° C., lower temperatures are possible and may be desired. The requirement as to temperature is only that it be sufficiently high to volatilize the alloy. Thus the particular alloy additive controls the finishing temperature of the fuel. Another desirable characteristic of these alloys is that they are normally stable in air at room temperature and brittle for easy crushing into powder form.

The equilibrium pressure of CO over a $UO_2$—C mixture is expressed as $$\log P_{(atm)} = 9.576 - \frac{19.740}{T(°K.)}$$

Since the carbothermic reduction reaction is normally carried out in a vacuum chamber where the ultimate of the pumping system is about $10^{-4}$ to $10^{-5}$ atmospheres, that portion of the reaction near the end, i.e., the last 1% of oxide being converted to carbide, is considered basically a function of temperature. This means that the temperature must normally be raised from 1500 to 2000° C. to provide the driving force (for solid-solid diffusion) to finish the reaction. Also, the $UO_2$—C reaction is a solid-solid reaction (to obtain a solid product). Complete reaction requires perfect intimate contact between reactants, and this is seldom achieved in actual practice. Therefore, solid-solid diffusion limits the reaction completion. The purpose of the uranium alloy additives in forming a liquid phase is to provide a transfer media through which oxide and carbon can react during the finishing portion of the reaction and thereby lower the finishing temperature.

While a preferred embodiment of the invention has been described, as required, the scope of the invention is defined in the following claims.

I claim:
1. The method of producing hypostoichiometric uranium carbide comprising the steps of blending a mixture of uranium oxide, carbon and an alloy of uranium with a metal selected from the group consisting of silicon, aluminum, iron, nickel, chromium, manganese and cobalt, wherein the ratio of carbon to uranium oxide is substantially 13.5% by weight and the weight of the uranium alloy is in the range of 1–5% of the total weight of the uranium oxide and carbon, and heating said blend in a reducing atmosphere to a temperature greater than the vaporization temperature of the alloy metal, but less than the vaporization temperature of uranium.

References Cited

UNITED STATES PATENTS

| | | | |
|---|---|---|---|
| 1,829,950 | 11/1931 | Voigtlander et al. | 23—349 |
| 2,448,479 | 8/1948 | Wichelm et al. | 23—349 |
| 2,905,552 | 9/1959 | Holden et al. | |
| 3,136,629 | 6/1964 | Williams et al. | 23—349 |
| 3,320,034 | 5/1967 | Strausberg | 23—349 |

OTHER REFERENCES

AEC Document No. NAA–SR–10624, p. 5, June 15, 1966.

AEC Document No. TID–7614, pp. 84 and 86, April 1961.

CARL D. QUARFORTH, *Primary Examiner.*

R. L. GRUDZIECKI, *Assistant Examiner.*